United States Patent [19]

Inman et al.

[11] Patent Number: 5,692,363
[45] Date of Patent: Dec. 2, 1997

[54] SQUARE BALE BAGGER

[75] Inventors: Larry Inman; Mike Koskela, both of Astoria, Oreg.

[73] Assignee: Ag-Bag International Limited, Warrenton, Oreg.

[21] Appl. No.: 600,514

[22] Filed: Feb. 13, 1996

Related U.S. Application Data

[63] Continuation-in-part of Ser. No. 371,806, Jan. 11, 1995, Pat. No. 5,628,168.

[51] Int. Cl.$^6$ ............................................................ B65B 9/10
[52] U.S. Cl. ......................... 53/567; 53/575; 53/576
[58] Field of Search ........................... 53/527, 529, 530, 53/556, 567, 575, 576, 585

[56] References Cited

U.S. PATENT DOCUMENTS

| | | | |
|---|---|---|---|
| 5,220,772 | 6/1993 | Koskela et al. | 53/567 |
| 5,385,002 | 1/1995 | Cundall | 53/576 |
| 5,398,487 | 3/1995 | Inman et al. | 53/567 |
| 5,408,809 | 4/1995 | Cullen | 53/567 |
| 5,408,810 | 4/1995 | Cullen | 53/567 |
| 5,421,144 | 6/1995 | Inman et al. | 53/567 |
| 5,425,221 | 6/1995 | Pronovost et al. | 53/567 |
| 5,465,559 | 11/1995 | Heiner et al. | 53/567 |
| 5,469,693 | 11/1995 | Brodrecht | 53/567 |
| 5,517,806 | 5/1996 | Cullen | 53/567 |

*Primary Examiner*—Daniel Moon
*Assistant Examiner*—Ed Tolan
*Attorney, Agent, or Firm*—Robert L. Harrington

[57] ABSTRACT

A machine for inserting baled material into an elongate elastic sheath. The machine has a moveable upper frame for enlarging the opening through which the bales will travel as they are inserted into the sheath. An elastic sheath is mounted on and surrounds radially moveable paddles and an end of a cradle. The paddles are moved radially outward to enlarge the opening of the sheath and thereby stretch the sheath. The cradle receives the bales to be inserted into a sheath and has a bale pusher for pushing the bales into the sheath. The bale pusher has ram extensions that are pivoted into a position to extend the reach of the pusher to facilitate inserting the last bale into the elastic sheath and through the machine. The machine is portable and has wheels that are mounted in one position for the bagging operation and are mounted in another position for transporting the machine. Adjustment mechanism is provided for adjusting the wheels in the bagging position to adjust for ground clearance to minimize the drop off distance for the bales as they enter the sheath and are deposited on the ground. Bale pushers are mounted to the upper frame for aligning an upper tier of stacked bales that may be skewed relative to a bottom tier.

10 Claims, 4 Drawing Sheets

SQUARE BALE BAGGER

This application is continuation-in-part of application Ser. No. 08/371,806, filed Jan. 11, 1995 now U.S. Pat. No. 5,628,168. In particular, it is a continuation of that portion of Ser. No. 08/371,806 having reference to FIGS. 12–14 and to a parent case thereto now abandoned, Ser. No. 08/212,244, filed Mar. 14, 1994. This prior disclosure is incorporated herein by reference.

FIELD OF THE INVENTION

This invention relates to square bale bagging and more particularly to an apparatus for accommodating various sizes of large heavy bales.

BACKGROUND OF THE INVENTION

Bale bagging was originally developed to provide alternate dry storage for hay bales. Baling has itself expanded from conventional small sized bales of hay and straw to huge bales weighing thousands of pounds each. The size and weight of the bales created problems for bagging of the bales and those problems have in turn generated improvements to the bagging process and machines. A recent new direction of baling is square bale bagging of silage. Such provides yet further problems for the bale bagging industry. The bales are large and because silage is green or moist, they are even greater in weight. The bags used for bagging have to be increasingly stronger and the machines that stretch the bags to the open bale receiving position have to be designed to effectively stretch the bags to accommodate the particular dimensions of the bale size being bagged and yet they have to be further adjustable, e.g., from field to field to accommodate bales having different dimensions.

BRIEF SUMMARY OF THE INVENTION

In prior bale baggers, the bales were pushed through an elevated platform and then allowed to drop onto the ground. The heavy weight created problems and the present invention provides for the platform to tilt downwardly in the rearward direction to allow the bales to slide off the platform rather than drop from an elevated position.

The expansion fingers are limited in their adjustability, e.g., by actuating cylinders and previously when different sized bales were to be baled, the cylinders were removed or remounted on the frame at a different inwardly or outwardly position. The remounting process in prior machines may be undesirable as it can provide a weakness not acceptable for the stronger bags. In the present invention, the frame itself is adjustable for accommodating different sizes whereas the cylinders for the expansion fingers are retained in position relative to the frame.

The silage bales will occasionally have projecting stems that can snare and snag the bag when sliding the bale through the bag opening. This problem is relieved by providing a heavy tarp-like material that folds inwardly with the entry of the bale in the area where such snagging is most likely to occur.

These and other inventions incorporated into the bale bagging apparatus hereof will become apparent with reference to the following detailed description and drawings referred to therein.

DESCRIPTION OF THE PREFERRED EMBODIMENT

Figure 1:
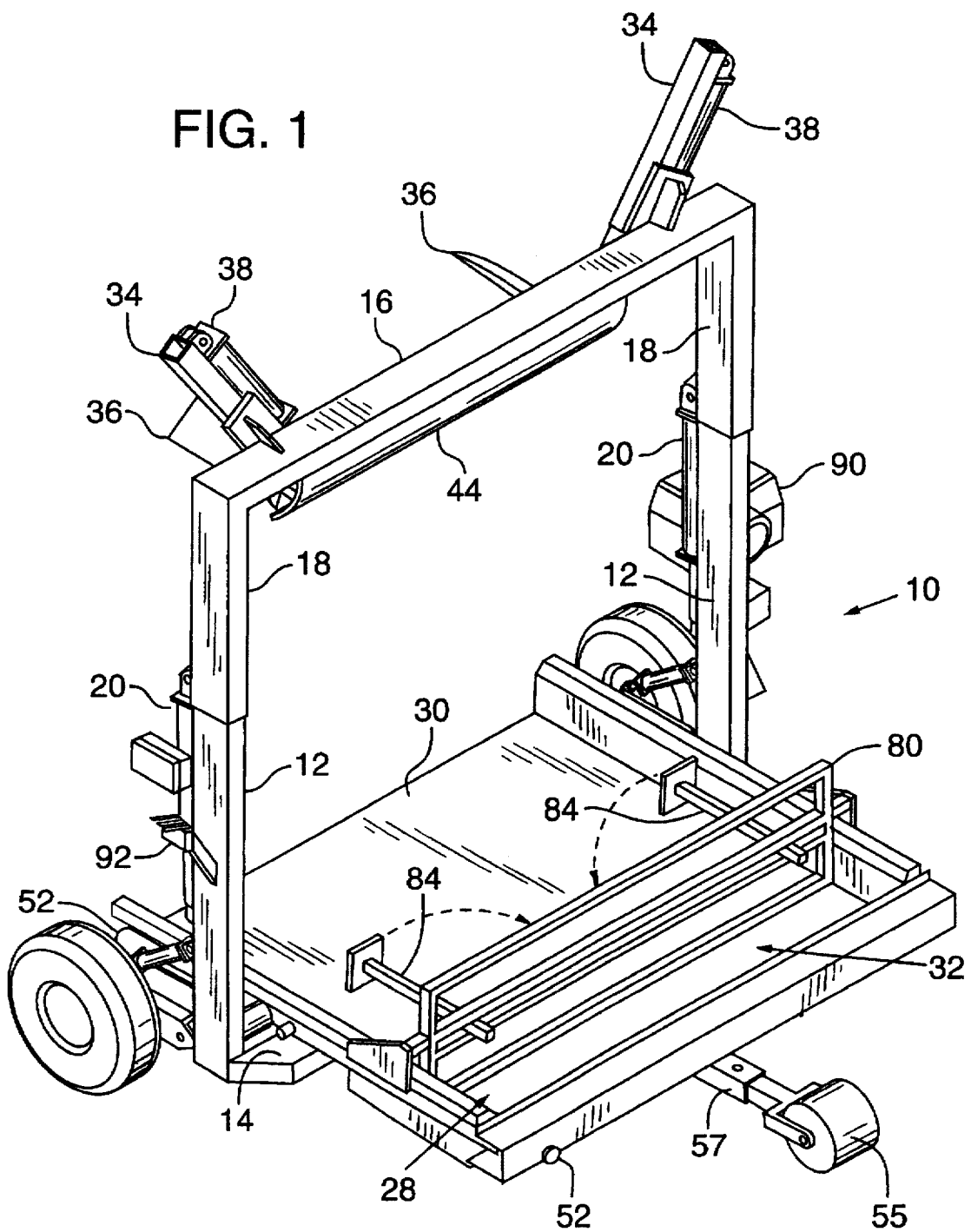
FIG. 1 is a perspective view of a bagging machine.

FIG. 1 illustrates a bagging machine 10 arranged to insert baled material into an elongate elastic sheath. The machine 10 is arranged and suited for inserting large bales sequentially into an elastic sheath and/or inserting multiple bale units into an elongate elastic sheath. Multiple bale units refers to multiple bales that are stacked together as a unit and then are sequentially fed into the elongate elastic sheath. The machine 10 has an expandable frame for expanding an opening through which the bales will be passed into the elongate elastic sheath and has mechanism to adjust the ground clearance of the machine 10 during the bagging operation to minimize the bale drop off distance. The machine 10 is further arranged for ease of transport from site to site.

Figure 2:
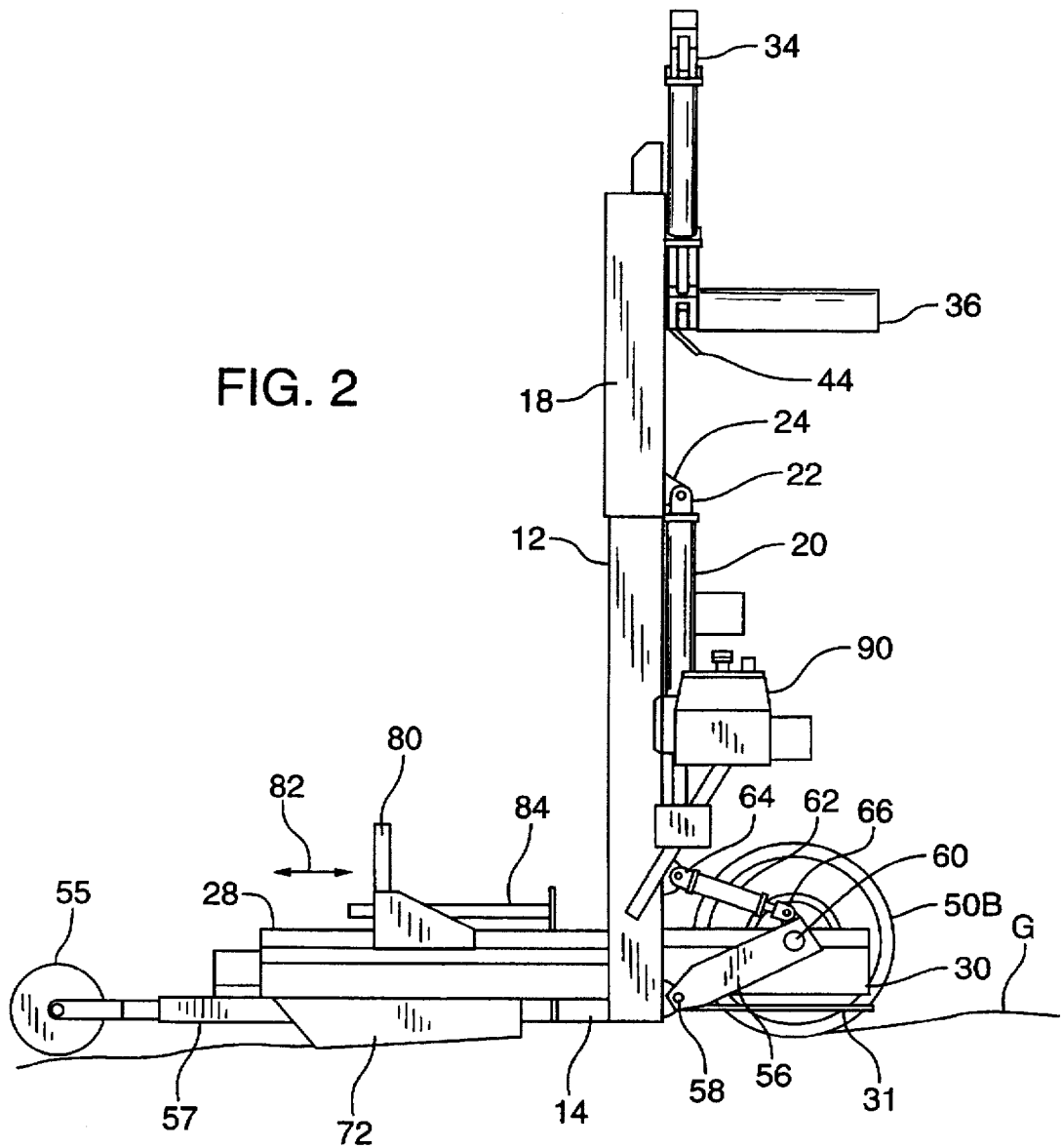
FIG. 2 is a side view of the bagging machine of FIG. 1.

Referring to FIGS. 1 and 2, the machine 10 has vertical members 12 extending upward from each side of a chassis 14. A top frame comprising a horizontal member 16 extended between two vertical members 18 is slidably mounted to the vertical members 12. The vertical members 18 are slidably mounted on the vertical members 12 with the vertical members 18 fitting over the vertical members 12 in a telescoping manner. A cylinder 20 (FIG. 2) mounted to each of the lower vertical members 12 on a conventional bracket has its piston rod end 22 connected to a bracket 24 on each of the upper vertical members 18. By extending and retracting the cylinder rod 22 of the cylinder 20, the top frame may be elevated and lowered by the cylinder 20. A cradle 28 is mounted on the chassis 14 between the vertical support members 12 and as seen in FIG. 1, the cradle 28 extends between the vertical support members 12. The cradle 28 is arranged to receive bales to be deposited into an elastic elongate sheath and will support the bale or bales as the bales are pushed into the elastic elongate sheath.

Stretcher arm assemblies 34 are mounted to the horizontal member 16. An elastic sheath (not shown in the figures) is fitted around the paddles 36 of the stretcher arm assemblies 34 and an end 30 of the cradle 28. The paddles 36 of the stretcher arm assemblies are moved radially inward to facilitate mounting of the elastic sheath (bag). The stretcher arm assemblies 34 are arranged to enlarge the opening of the elastic sheath (bag). The paddles 36 of the stretcher arm assemblies 34 are moved substantially radially outward by cylinders 38 to stretch and enlarge the opening of the elastic sheath.

A curtain 44 is mounted to the horizontal member 16 with a curtain 44 extending substantially between the stretcher arm assemblies 34. The curtain 44 is provided to prevent the bale being pushed into and deposited within the elastic sheath from prematurely forcing the bag off of the paddles 36 and to prevent extending stems or stalks extending from the bale from piercing the elastic sheath extended between the paddles 36.

Figure 3:
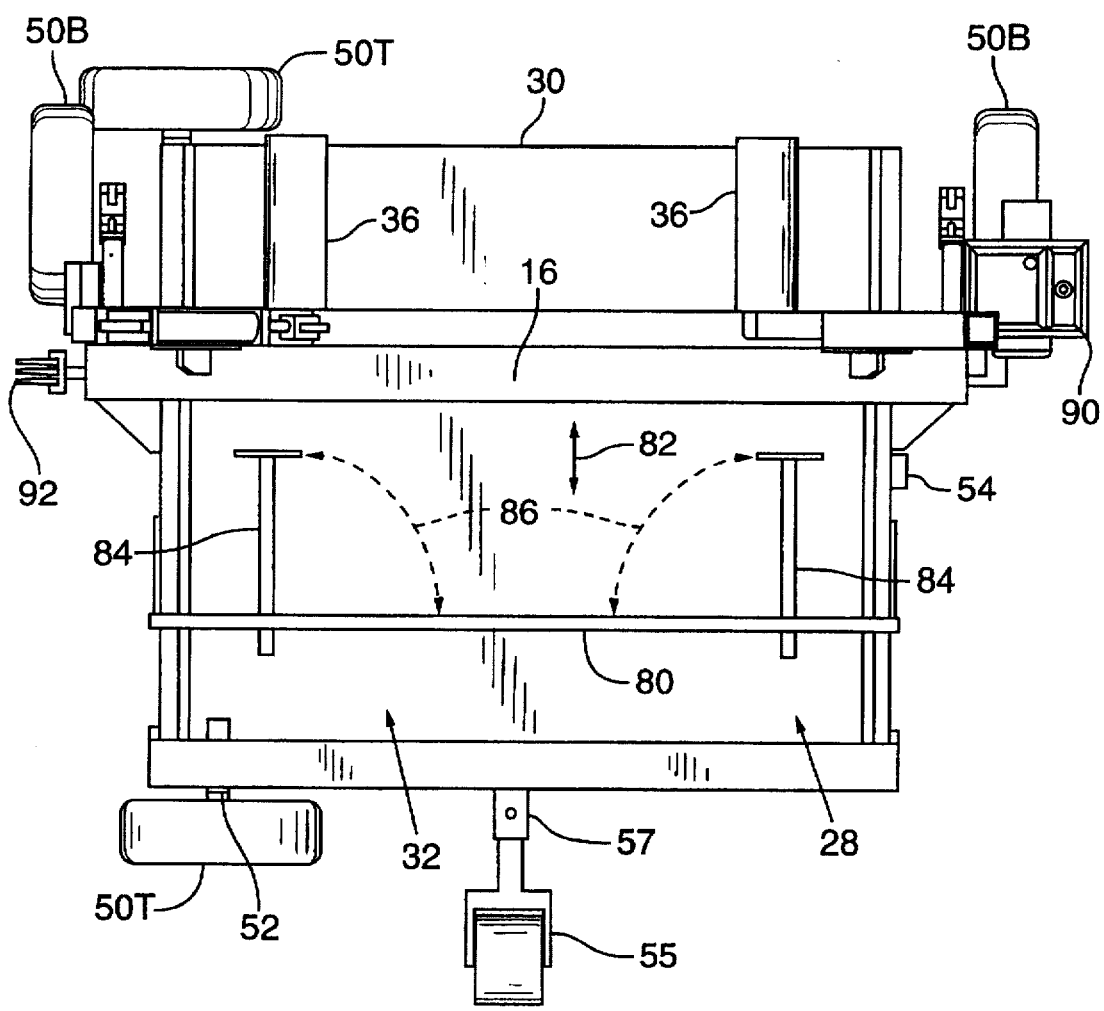
FIG. 3 is a top view of the bagging machine of FIG. 1.

FIGS. 2 and 3 illustrate the wheel arrangement for the machine 10 for the bagging operation and also for the transport mode. The wheels 50 are mountable in two different positions, one for the transport mode of the bagging machine 10 and the other for the bagging operation of the bagging machine. FIG. 3 illustrates the wheels 50 in dashed outline and designated as 50T mounted to the chassis 14 of the machine 10 for transport mode. Wheel sockets 52 are provided on each side of the chassis 14 for the mounting of the wheels 50 in the positions indicated by 50T.

When the machine 10 is used for a bagging operation, the wheels 50 designated in FIG. 3 as 50B for the bagging operation are mounted to adjustable support mechanisms. The adjustable support mechanisms to which the wheel 50B are mounted is best seen in FIG. 2. A wheel support 56 is pivotally mounted to the chassis 14 at 58 and the wheel 50B is mounted to the support 56 at 60. A cylinder 62 mounted to the vertical support 12 at 64 is coupled to the support 56 at 66. The extension and retraction of the cylinder rods of the cylinders 62 will thus elevate and lower the wheels 50 relative to the chassis 14 and thus will elevate and lower the machine 10 in reference to the ground G.

An angled skid pan 72 is mounted to the underside of the chassis 14 as illustrated in FIG. 2 and is provided to support the position of the machine 10 when in the bagging operation. The pan 72 is mounted at an angle in reference to the chassis 14 to accommodate the adjusting capability of the adjustable wheel arrangement when in the bagging mode.

A gauge wheel 55 is mountable in a socket 57 of the machine 10. The gauge wheel 55 guides the machine 10 in a straight line during the bagging operation and provides additional support to the machine 10. The socket 57 is also utilized for the insertion of a conventional hitch for moving the machine between one bagging location to another at a bagging site.

Refer now to FIGS. 1 and 3. A bale pusher 80 is movably mounted on the cradle 28 of the machine 10. The bale pusher 80 is movable along the cradle 28 as indicated by directional arrow 82 of FIGS. 2 and 3. The bale pusher 80 is movable by a known drive motor and chain arrangement (not shown in the figures). Pivotally mounted to the bale pusher 80 are ram extensions 84. The ram extensions are pivotable as indicated by arrow 86 in FIG. 3 and as indicated the ram extensions 84 may be pivoted to a position substantially parallel to the bale pusher 80 and may be pivoted to a position whereat they are substantially normal to the bale pusher 80. The ram extensions 84 are pivotally mounted to the bale pusher 80 in a known conventional manner and preferably are secured in the parallel position by known fasteners. The ram extensions 84 are provided to extend the reach of the bale pusher 80 and are utilized for inserting the last bale into the elongate elastic sheath.

As previously mentioned, the bagging machine 10 is arranged for the insertion of baled material into an elongate elastic sheath (bag). To set up for a bagging operation, the wheels 50 are mounted to the support member 56 as indicated by wheels 50B in FIG. 3 and also as shown in FIG. 2. The gauge wheel 55 is mounted in the socket 57. The top frame 16, 18 of the bagging machine 10 is adjusted on the vertical support members 12 to a desired elevation to obtain the desired opening through which the baled material will pass. Basically the opening is defined by the distance between the upper horizontal member 16 and the cradle end 30 and the distance between the vertical members 12 (18). An elastic sheath is fitted around the end 30 of the cradle 28 and the paddles 36 of the stretcher arm assemblies 34. The paddles 36 are moved radially outward by operation of the cylinders 38 to thus enlarge the opening of the sheath (bag) and to stretch the elastic sheath.

Machine 10 is lowered toward the ground G by operation of the cylinder 62 to minimize the distance from the ground G to the end 30 of the cradle 28. The lowering of the machine 10 tilts the machine rearward around the support of the skid pan 72 and thereby reduces the drop off distance for the bale (or bales). This avoids problems encountered by dropping the bales from an elevation when exiting the machine, e.g., the tendency to stretch the bag and create spacing between the bales.

The bale pusher 80 is retracted to the end 32 of the cradle 28 and the rams 84 are pivoted to a substantially parallel attitude with respect to the pusher 80. The curtain 44 extended along the horizontal member 16 protects the elastic sheath (bag) that is extended and stretched between the paddles 36 of the stretcher assemblies 34. A portion of the elastic sheath mounted on the stretcher arm paddles 36 and end 30 of the cradle 28 is pulled off and tied to form a closed end.

A bale (or bale unit) to be inserted into the elastic sheath is deposited on the cradle 28 in front of the bale pusher 80. The bale pusher 80 is moved toward end 30 of the cradle 28 and in the process will force the bale received on the cradle 28 against the closed end of the elastic sheath. As the bale progresses into the elastic sheath, it will pull the elastic sheath off of the paddles 36 and the end 30 of the cradle 28. When the pusher 80 has reached the end of its stroke, i.e., it has moved its maximum distance toward end 30 of the cradle 28, it is retracted and another bale (or bale unit) is deposited in front of the pusher 80. The pusher 80 is then again advanced toward end 30 of the cradle 28 to force the first bale further into the bag and in the process will be deposited on the ground. This process is continued until the last bale to be deposited in the elastic sheath is received on the cradle 28.

For the last bale, the pusher 80 is advanced toward the end 30 of the cradle 28 to place the last bale in the mouth of the bag and is then retracted toward end 32 of the cradle 28. The rams 84 are then pivotally rotated to a position where they are substantially perpendicular to the pusher 80. The pusher 80 is then advanced toward end 30 of the cradle 28 and in the process, the extending rams will force the last bale received on the cradle 28 into the elastic sheath and off of the end 30 of the cradle 28. The open end of the sheath is then tied off to provide a closed container for the bale received therein.

Figure 4:
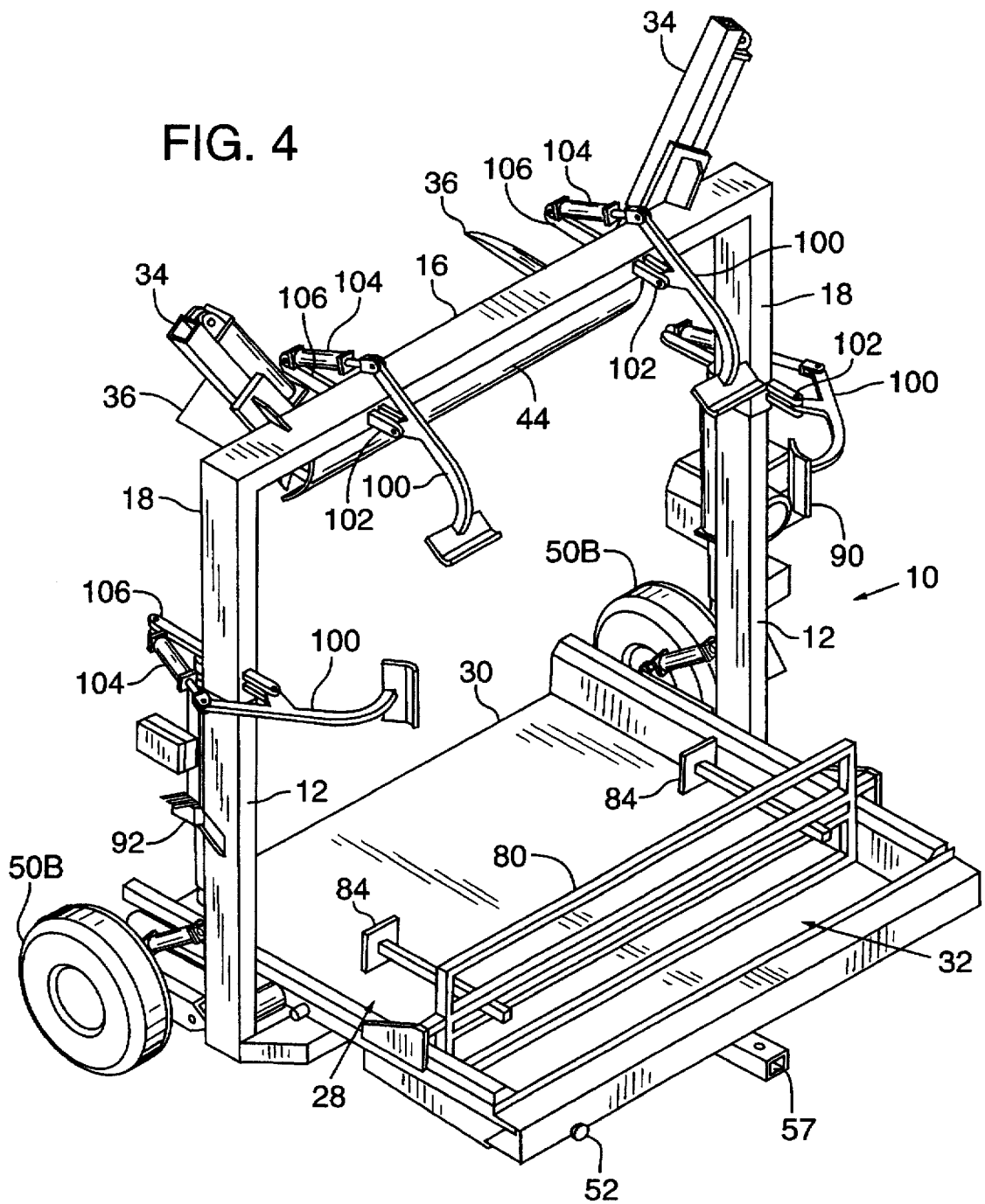
FIG. 4 is another perspective view of the bagging machine of FIG. 1 but including a bale alignment feature.

There are occasions when stacked bales (bale unit) are being inserted simultaneously into an elastic sheath. The upper row of the stack of the bales may become skewed or offset from the bottom layer (row) of the bales. When the bales become skewed or misaligned, it is desirable to realign the bales to minimize the resulting air gaps between the bales within the elastic sheath. FIG. 4 illustrates an arrangement of bale pushers that may be incorporated into the machine of FIG. 1 which will align the upper stack of bales on a lower stack of bales when and if they become misaligned or skewed.

The bales pushers 100 are pivotally mounted to the horizontal member 16 and the vertical members 18 of the top frame assembly of the machine 10. The bale pushers 100 are pivotally mounted to a bracket 102 extending from the frame members 16 and 18. A cylinder 104 is mounted to a bracket 106 extending from the frame members 16 and 18. Bale pushers 100 by extension and retraction of the cylinder rod of the cylinder 104 will thus come into contact with a misaligned bale as the bale pusher 100 is pivoted. The bale pushers 100 will thus force the bale that is out of alignment to become aligned once again with the lower tier of bales on the cradle 28. By realigning the bales on a stack, the spacing between the bales when inserted into the elastic sheath will be minimized.

The machine 10 is powered by a conventional power unit 90 such as an engine and hydraulic pump. Conventional operating valves 92 are provided for the operation of the individual cylinders and motors of the machine 10. The hydraulic circuitry and the controls of the machine 10 are not detailed since they are not part of the present invention and they are well known in the industry.

When the machine 10 is lowered to minimize a ground clearance between the end 30 of the cradle 28 and the ground G, the elastic sheath surrounding the cradle 28 and the paddles 36 will be in close proximity to the ground G. To protect the elastic sheath (bag) from being snagged or otherwise torn by objects on the ground, a protective bag pan 31 extending from the chassis 14 is provided.

The machine 10 is arranged for transport by mounting the wheels 50 to the wheel sockets 52. The wheels 50 designated as 50T in FIG. 3 and shown in dash lines are shown in the mounted for transport mode. A hitch socket 54 best seen in FIG. 3 is provided for mounting a conventional hitch and thus the machine 10 is ready for transport by a towing vehicle. The top frame is preferably lowered (by operation of the cylinders 20) to its lowest point for transport to minimize the overall height of the machine 10.

Those skilled in the art will recognize that modifications and variations may be made without departing from the true spirit and scope of the invention. The invention is therefore not to be limited to the embodiments described and illustrated, but is to be determined from the appended claims.

We claim:

1. A bale bagger for large and multi-stacked bales comprising:

a chassis, a frame supported on the chassis, bag supporting fingers mounted on the frame, a cradle supported on the chassis for receiving and guiding bales from a position forwardly to a position rearwardly of the frame, and a bale pusher provided on the cradle for pushing bales rearwardly along the cradle;

support members provided on the chassis for supporting the chassis on the ground during operation and allowing resisted forward movement of the chassis along the ground;

said bag supporting fingers projected rearwardly from the frame for supporting a gathered bag and for deploying the bag filled with bales deposited therein by the pusher, rearwardly onto the ground as the chassis is moved forwardly; and said support members comprising a forward skid member and rear wheels, said rear wheels adjustably mounted to the chassis for lowering the rear end of the chassis and thereby tilting the chassis rearward and downward around the forward skid member, the rear wheels supporting the rear of the chassis in the tilted position to orient the cradle in an inclined position extending downwardly and rearwardly for sliding of the bales from the cradle onto the ground.

2. A bale bagger as defined in claim 1 wherein a bag is cooperatively supported in an open position by the fingers at the top and the cradle at the bottom, said support fingers being movably mounted on the frame between lower and upper positions for expanding the opening of a bag supported thereon, and a control for controllably moving the fingers.

3. A bale bagger as defined in claim 1 wherein the pusher is a horizontal gate-like member movable along the cradle and a pivotal ram extender pivoted between a position co-extensive with the pusher and projected rearwardly from the pusher for extending the reach thereof for pushing a bale past the frame and onto the ground, and a locking member locking the ram in either of the pivotal positions.

4. A bale bagger is defined in claim 1 where in the wheels are removable and remountable in a direction crossway to the direction of bag filling and a tow bar mounting for towing the bale bagger in said crossway direction, said bale bagger having a length shorter than the width as determined by the direction of bag filling.

5. A bale bagger as defined in claim 1 including a gauge wheel provided on said chassis and extended forward of said skid member, said gauge wheel cooperatively configured relative to said chassis when tilted to engage the ground and add support to the front end as the chassis moves over uneven ground.

6. A bale bagger for large and multi-stacked bales comprising:

a chassis, a frame supported on the chassis, bag supporting fingers mounted on the frame, a cradle supported on the chassis for receiving and guiding bales from a position forwardly to a position rearwardly of the frame, and a bale pusher provided on the cradle for pushing bales rearwardly along the cradle;

support members provided on the chassis for supporting the chassis on the ground and allowing resisted forward movement of the chassis along the ground;

said bag supporting fingers projected rearwardly from the frame for supporting a gathered bag and for deploying the bag filled with bales deposited therein by the pusher, rearwardly onto the ground as the chassis is moved forwardly;

said support members cooperatively arranged to orient the cradle in an inclined position extending downwardly and rearwardly for sliding of the bales from the cradle onto the ground; and a flexible protective curtain depending from the frame and partially covering the defined opening in the bag whereby a bale pushed into the opening engages and slides along the curtain interposed between the bag and the bale.

7. A bale bagger for large and multi-stacked bales comprising:

a chassis, a frame supported on the chassis, bag supporting fingers mounted on the frame, a cradle supported on the chassis for receiving and guiding bales from a position forwardly to a position rearwardly of the frame, and a bale pusher provided on the cradle for pushing bales rearwardly along the cradle;

support members provided on the chassis for supporting the chassis on the ground and allowing resisted forward movement of the chassis along the ground;

said bag supporting fingers projected rearwardly from the frame for supporting a gathered bag and for deploying the bag filled with bales deposited therein by the pusher, rearwardly onto the ground as the chassis is moved forwardly; and said frame including lower vertical side members projected upwardly from the chassis and cradled thereon, and an upper frame member including upper vertical side members telescopically interfit with the lower vertical members and an upper cross member interconnecting the upper ends of said upper vertical side members, and actuating members extending between the upper and lower vertical members for sliding vertical movement of the upper frame member as provided by the telescopic interfit of the vertical members, said fingers mounted on the upper frame member.

8. A bale bagger as defined in claim 7 wherein a bag is cooperatively supported in an open position by the fingers at the top and the cradle at the bottom, said support fingers being movably mounted on the frame between lower and upper positions for expanding the opening of a bag supported thereon, and a control for controllably moving the fingers.

9. A bale bagger as defined in claim 7 including a flexible protective curtain depending from the frame and partially covering the defined opening in the bag whereby a bale pushed into the opening engages and slides along the curtain interposed between the bag and the bale.

10. A bale bagger as defined in claim 7 wherein the pusher is a horizontal gate-like member movable along the cradle and a pivotal ram extender pivoted between a position co-extensive with the pusher and projected rearwardly from the pusher for extending the reach thereof for pushing a bale past the frame and onto the ground, and a locking member locking the ram in either of the pivotal positions.

* * * * *

UNITED STATES PATENT AND TRADEMARK OFFICE
CERTIFICATE OF CORRECTION

PATENT NO. : 5,692,363
DATED : Dec. 2, 1997
INVENTOR(S) : Inman

It is certified that error appears in the above-identified patent and that said Letters Patent is hereby corrected as shown below:

Col. 5, lines 49 - 57, replace with the following:

said support members comprising a skid member at the forward end of the chassis and extended below the chassis and engaging the ground during operation for resisting forward movement and also defining a pivot at the front of the chassis, and wheels at the rear end of the chassis adjustably mounted to the chassis for lowering the rear end of the chassis to a minimum spacing of the chassis above the ground, thereby tilting the chassis rearward and downward around the pivot defined by the forward skid member, said front pivot produced by the skid member pivot and the adjustability of the rear wheels cooperatively enabling the rear wheels to continue supporting the rear of the chassis in the tilted position for downward sliding of the bales from the cradle onto the ground.

Signed and Sealed this

Twenty-fourth Day of February, 1998

Attest:

BRUCE LEHMAN

Attesting Officer

Commissioner of Patents and Trademarks